United States Patent
Yao

(10) Patent No.: US 12,185,220 B2
(45) Date of Patent: Dec. 31, 2024

(54) MESSAGE ROUTING FOR PARTNER CARRIER SUBSCRIBERS

(71) Applicant: AT&T INTELLECTUAL PROPERTY I, L.P., Atlanta, GA (US)

(72) Inventor: Timothy Yao, Redmond, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 333 days.

(21) Appl. No.: 17/522,719

(22) Filed: Nov. 9, 2021

(65) Prior Publication Data

US 2023/0144632 A1    May 11, 2023

(51) Int. Cl.
*G06F 15/16* (2006.01)
*H04W 40/24* (2009.01)
*H04W 40/36* (2009.01)
*H04W 40/38* (2009.01)

(52) U.S. Cl.
CPC ......... *H04W 40/36* (2013.01); *H04W 40/248* (2013.01); *H04W 40/38* (2013.01)

(58) Field of Classification Search
CPC .... H04W 40/36; H04W 40/248; H04W 40/38
See application file for complete search history.

(56) References Cited

U.S. PATENT DOCUMENTS

| | | | | |
|---|---|---|---|---|
| 11,062,253 B1* | 7/2021 | Nanduri | ............ | H04L 12/1895 |
| 2003/0126137 A1* | 7/2003 | McFadden | ............ | G06F 16/288 |
| 2004/0125149 A1* | 7/2004 | Lapidous | ............ | G06F 3/0481 |
| | | | | 715/808 |
| 2008/0046592 A1* | 2/2008 | Gilhuly | ................ | H04L 51/214 |
| | | | | 709/239 |
| 2009/0204724 A1* | 8/2009 | Xiao | ..................... | H04L 67/147 |
| | | | | 709/243 |
| 2015/0079998 A1* | 3/2015 | Lowman | ........... | H04M 3/53316 |
| | | | | 455/445 |
| 2020/0052979 A1* | 2/2020 | Clemm | ............... | H04L 41/5019 |
| 2020/0097513 A1* | 3/2020 | Zheng | ................. | H04L 67/1076 |
| 2020/0374251 A1* | 11/2020 | Warshaw | ............... | H04L 51/56 |
| 2021/0082063 A1* | 3/2021 | Miller | .................... | H04L 67/52 |
| 2021/0409314 A1* | 12/2021 | Murao | .................. | G06Q 20/02 |
| 2023/0038228 A1* | 2/2023 | Chen | ..................... | H04L 67/63 |

* cited by examiner

*Primary Examiner* — Atique Ahmed

(57) ABSTRACT

The disclosed technology is directed towards routing, by a mobile network operator, a message to a messaging hub associated with a partner carrier or to the partner carrier itself. In response to receiving a message to reroute, a data store (e.g., an ENUM database) is queried to attempt to obtain information corresponding to the routing. For example, when the query response includes a regular expression that specifies a domain, the domain is evaluated against a data structure of respective messaging hubs associated with respective domains. If the returned domain is matched such that an associated messaging hub is identified, the message is routed to the identified messaging hub; otherwise a mobile network partner carrier is determined based on the telephone number of the message recipient, and the message is routed to the determined partner carrier.

20 Claims, 10 Drawing Sheets

MESSAGE ROUTING FOR PARTNER CARRIER SUBSCRIBERS

TECHNICAL FIELD

The subject application relates to message communication in general, and more particularly to routing messages to partner carriers, including partner carrier messaging hubs.

BACKGROUND

More and more mobile network operators (MNOs) are partnering up with rich communication services (RCS) messaging hubs to act as their messaging core for a subset of their subscribers, including customers of mobile virtual network operators (MVNOs). User capability exchange (UCE) services also may be served by a messaging hub.

While it is straightforward for a mobile network operator to deliver messages to their own subscribers, it is not straightforward to route a message to a customer of a partner carrier. In general, this is because the partner carrier subscriber's RCS messaging services and user capability exchange (UCE) services may be being served by a messaging hub, or instead may be being served by the partner carrier itself.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
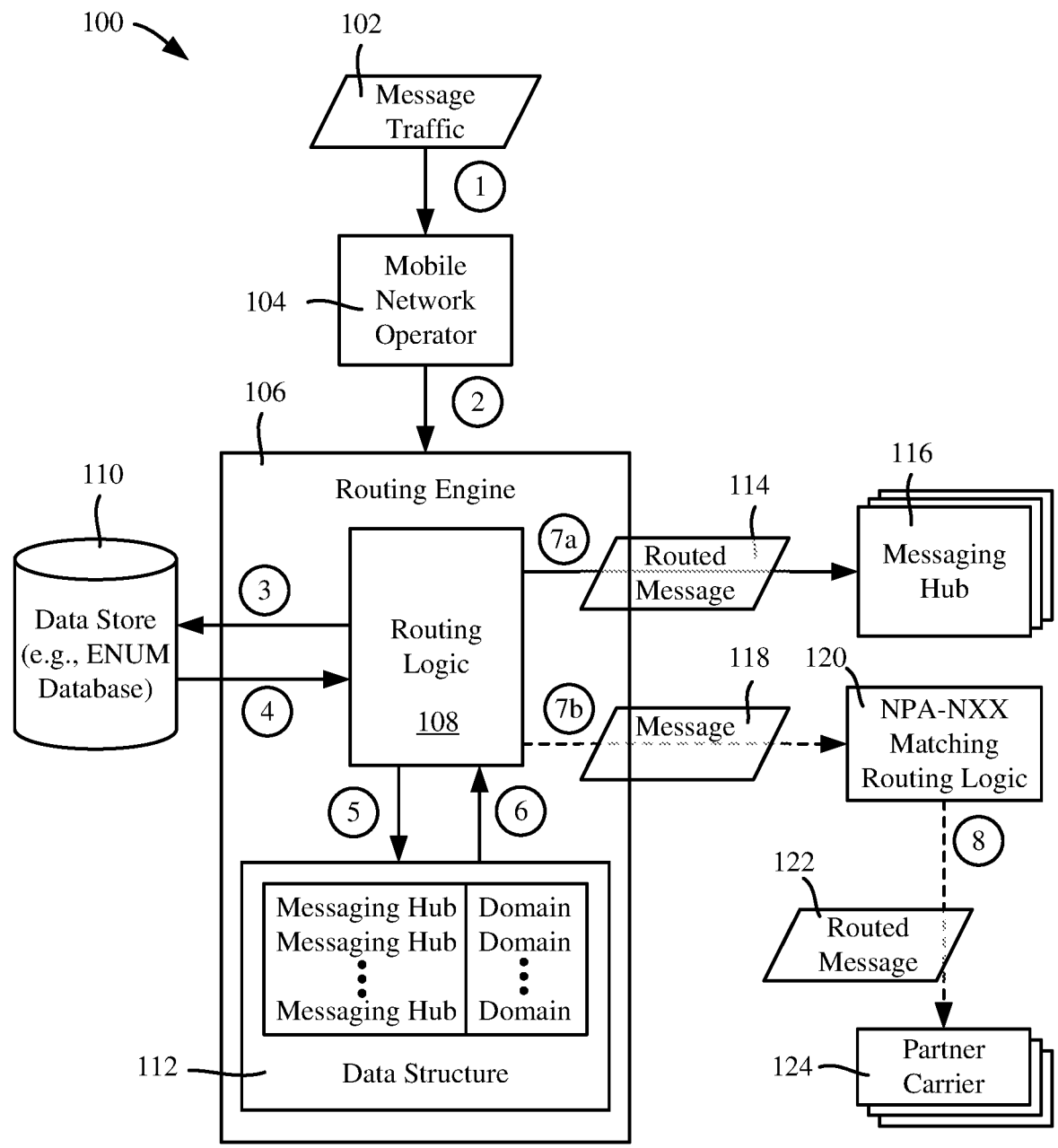
FIG. 1 is a block diagram illustrating an example system configured to route message traffic, in accordance with various aspects and embodiments of the subject disclosure.

The technology described herein is generally directed towards routing messages to a messaging hub or a partner carrier, depending on the recipient customer's registration status. In one implementation, to determine whether a partner carrier subscriber is served by messaging hub or served by the partner carrier itself, the technology described herein (e.g., a routing engine) accesses a data store (e.g., a data repository) that contains information about the registration status of the partner carrier subscribers. The routing engine consumes the registration status and determines a route to enforce, that is, a messaging hub or a partner carrier.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

FIG. 1 shows block diagram/dataflow example of a system 100 in which some amount of message traffic 102 is received from the subscribers of a mobile network operator 104 that is the mobile originating network for the mobile originated message. For a message that is not to one of the mobile network operator's own subscribers, that is, the message is to be mobile terminated on a subscriber device of another mobile network operator or mobile virtual network operator, the message needs to be routed, on an individual partner carrier subscriber basis, to a messaging hub or a partner carrier.

As represented in FIG. 1 by the arrows labeled one (1) and two (2), for such traffic 102, the mobile network operator 104 forwards the traffic to a routing engine 106. The routing engine 106 can include one or more network devices of the mobile network operator 104 or can be otherwise coupled to network equipment of the mobile network operator 104. Note that message traffic to the mobile network operator's is handled directly, that is, without needing rerouting via the routing engine 106.

As represented in FIG. 1 by the arrows labeled three (3) and four (4), routing logic 108 in the routing engine 106 queries a data store 110 (e.g., an enumerated, or ENUM database) with information within a message regarding the other carrier's subscriber recipient data. Depending on what the response to the query indicates, the routing logic can determine whether to route a message to a partner's messaging hub provider, or to a partner carrier.

In one implementation, the data store 110 can return a response that includes a regular expression (REGEX) that the routing logic parses to determine if the REGEX identifies a domain. The following is an example response containing an example service and REGEX that includes a domain:

| Answers |
|---|
| 0.0.0.8.5.5.5.3.1.2.1.e164.arpa: type NAPTR |
| Name: 0.0.0.8.5.5.5.3.1.2.1.e164.arpa |
| Type: NAPTR (Naming Authority Pointer) (35) |
| Class: IN (0x0001) |
| Time to live: 1 (1 second) |
| Data length: 62 |
| Order: 100 |
| Preference: 20 |
| Flags Length: 1 |
| Flags: u |
| Service Length: 7 |
| Service: E2U+rcs |
| Regex Length: 46 |
| Regex: !^.*$!sip:+12135558000@some.partner.com;user=phone! |
| [Replacement Length: 6] |
| Replacement: <Root> |

If a domain (e.g., "some.partner.com" in the above example response) is identified in the response, the routing logic 108 evaluates (arrows five (5) and six (6)) a data structure 112 (e.g., a table) that maps messaging hubs to domains (and vice-versa). If a matching messaging hub is found for a domain, the routing logic 108 routes the message 114 to the messaging hub 116 associated with that domain, as represented via arrow (7a).

Otherwise, the routing logic forwards the message 118 (dashed arrow (7b)) to NPA-NXX matching routing logic 120 (where "NPA" or "numbering plan area" is the area code for a telephone number corresponding to the intended recipient and "NXX" refers to the prefix/first three digits of that telephone number). Based on the NPA-NXX of the intended recipient's telephone number for that message, the message 118 is rerouted (block 120, dashed arrow 8) to a partner carrier 124 associated with that NPA-NXX. Note that the NPA-NXX matching routing logic 120 can be incorporated into one or more network devices of the mobile network operator 104 or can be otherwise coupled to network equipment of the mobile network operator 104, e.g., as a service.

Figure 2:
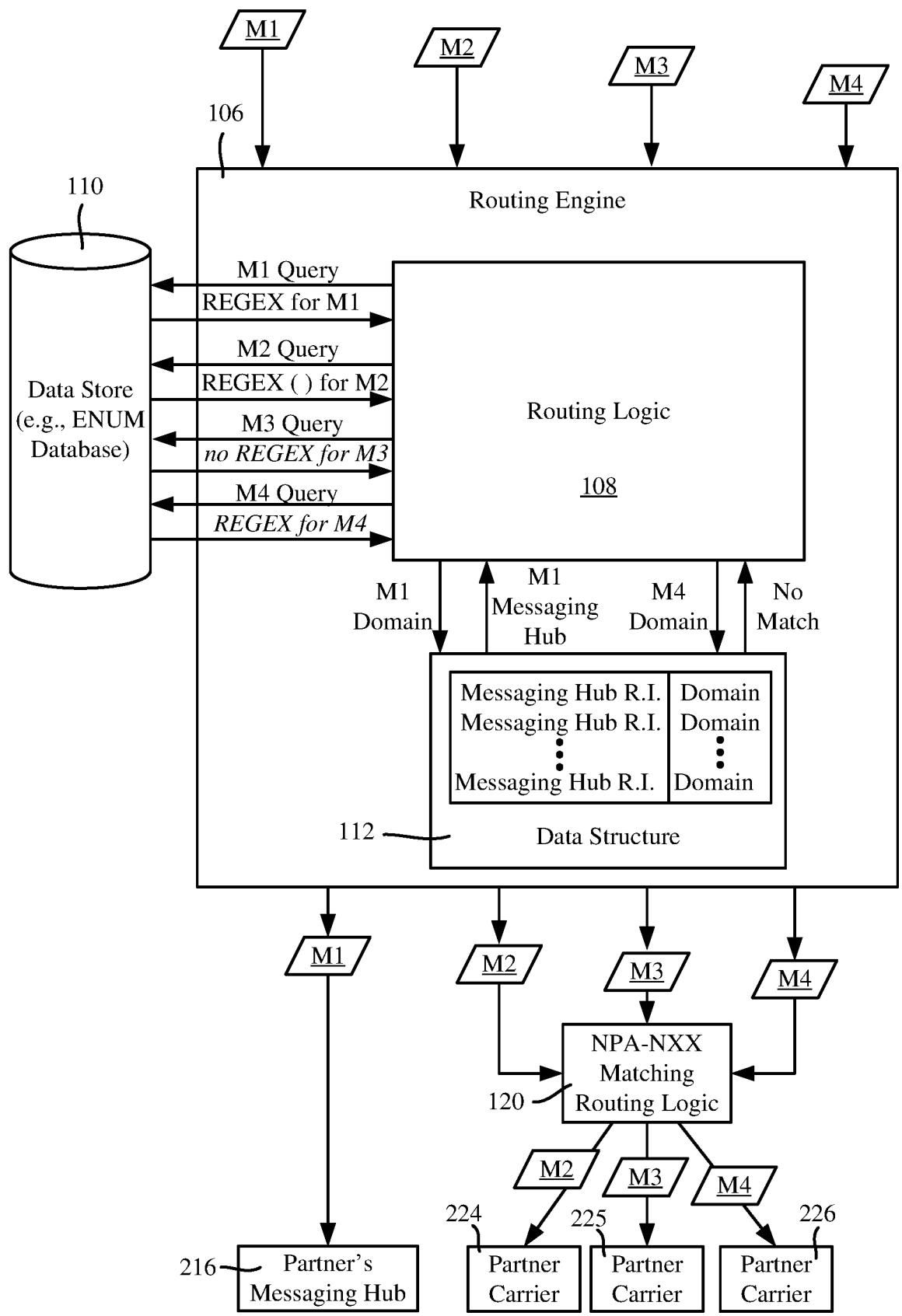
FIG. 2 is a block diagram illustrating an example system configured to route messages based on information returned from a data store, in accordance with various aspects and embodiments of the subject disclosure.

FIG. 2 is a more specific example of how four messages M1-M4 are routed based on the intended recipient information in each message. Note that multiple messages are tracked and handled individually, but to an extent can be handled in batches, in parallel and/or substantially in parallel. When the routing engine 106 receives and processes message M1, the routing logic 108 queries the data store 110 based on the message M1, and in this example receives a REGEX in response to the query. The routing logic 108 matches the domain to a messaging hub (its routing information R.I.) and thereby routes the message M1 to a partner's messaging hub.

When the routing engine 106 receives and processes message M2, the routing logic 108 queries the data store 110 based on the message M2; in this example the REGEX does not contain a domain in the response to the query. Thus, message M2 is sent to the NPA-NXX matching routing logic 120, and from there routed to a partner carrier 224.

For the message M3, the routing logic 108 queries the data store 110 based on the message M3, however in this example the REGEX is absent in the response to the query. Thus, message M3 is sent to the NPA-NXX matching routing logic 120, and from there routed to a partner carrier 225; (note that it is feasible that the partner carrier could have been determined to be the same partner carrier 224 to which the message M2 was routed.

When the routing engine 106 receives and processes message M4, the routing logic 108 queries the data store 110 based on the message M1, and in this example receives a REGEX that contains a domain in response to the query. For this domain, however, the routing logic 108 is unable to match the domain to a messaging hub, and thereby sends the message M4 to the NPA-NXX matching routing logic 120, which causes the message M4 to be routed to a partner carrier 226.

Figure 3:
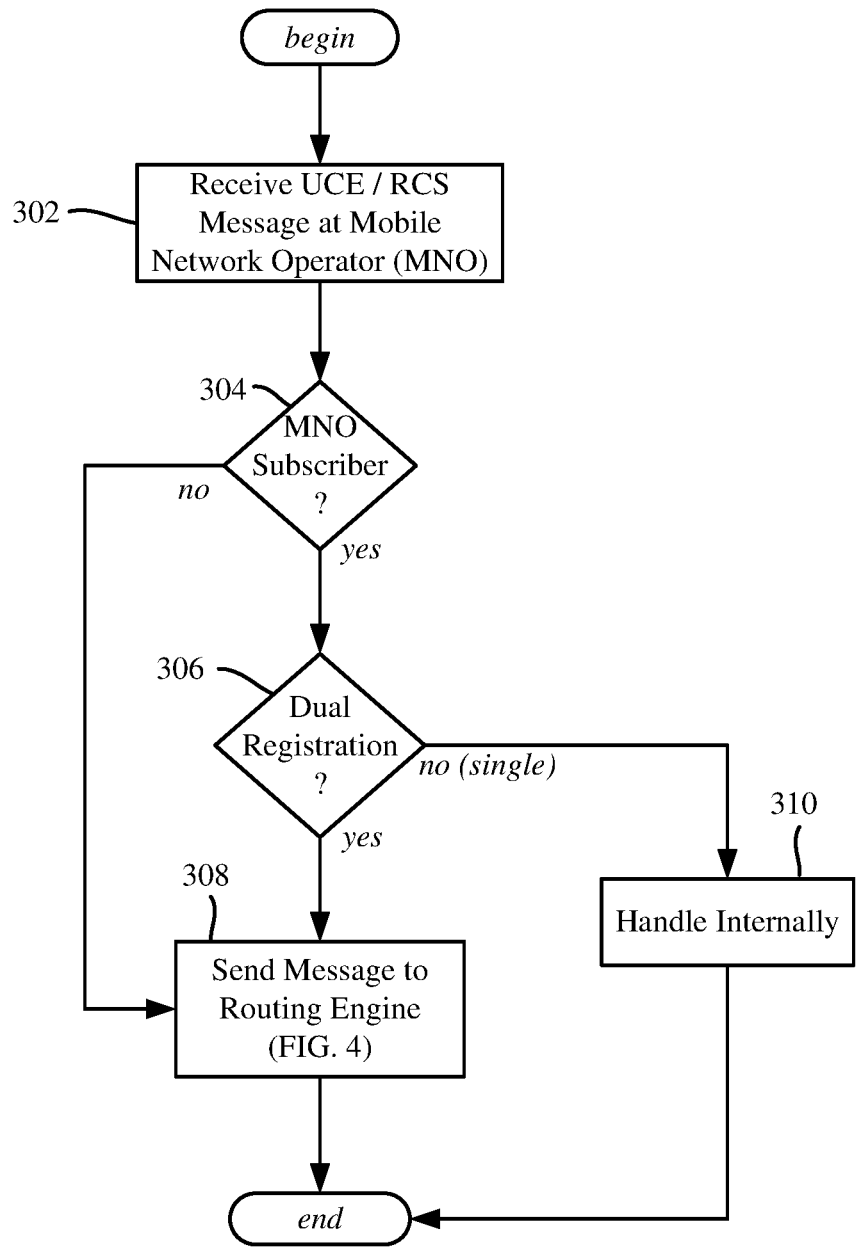
FIG. 3 is a flow diagram representing example operations related to handling a message received at a mobile network operator, in accordance with various aspects and embodiments of the subject disclosure.

FIG. 3 is a flow diagram showing example operations of a mobile network operator (MNO) when a rich communication services (RCS) or user capability exchange (UCE) message is obtained at operation 302 by an MNO. Operation 304 evaluates whether the message is to its own subscriber of the MNO. If not, the message is sent at operation 308 to the routing engine for processing for rerouting. Operation 306 evaluates whether the message is to a subscriber with a dual registration, that is, the subscriber is registered with the MNO for voice data but is registered with another carrier for messaging services. If so, the message is sent at operation 308 to the routing engine. If to a subscriber with a single registration with the MNO for voice and messaging services, then operation 310 handles the message internally at the MNO.

Figure 4:
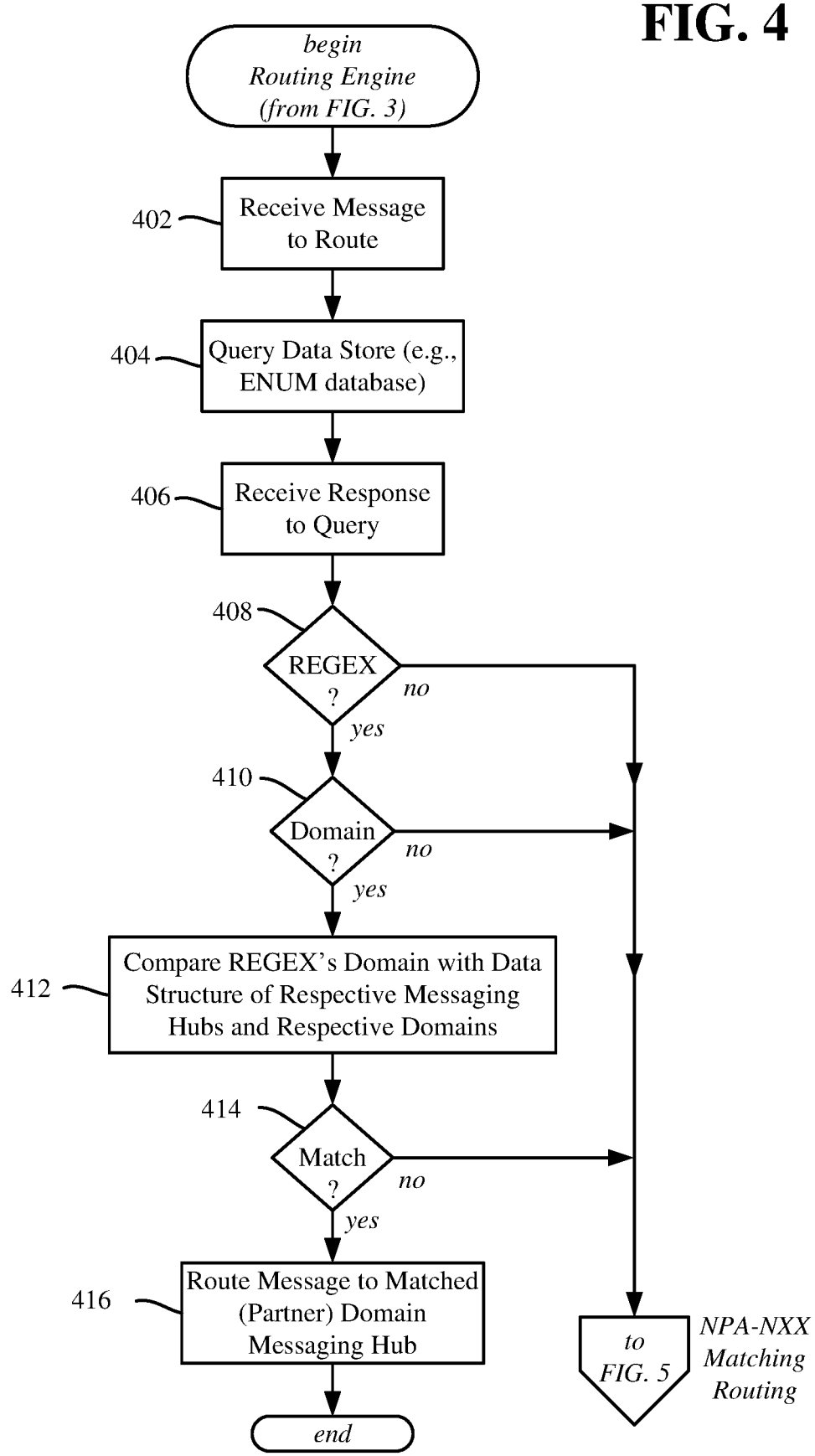
FIG. 4 is a flow diagram representing example operations related to routing a message, in accordance with various aspects and embodiments of the subject disclosure.
Figure 5:
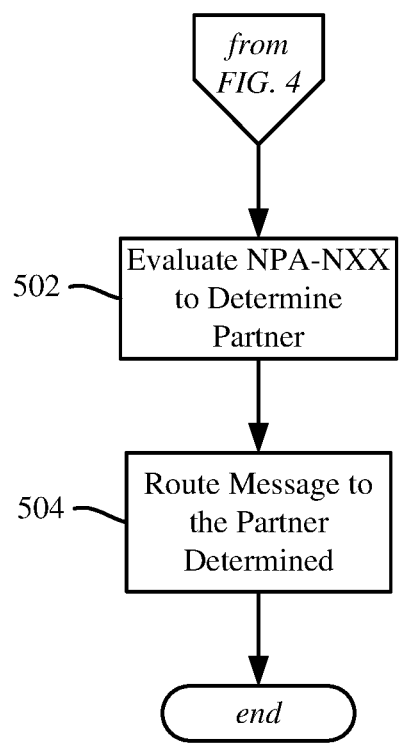
FIG. 5 is a flow diagram representing example operations related to determining a partner carrier for routing a message, in accordance with various aspects and embodiments of the subject disclosure.

FIGS. 4 and 5 comprise a flow diagram showing example operations of the routing engine, and the NPA-NXX matching routing. Operation 402 represents the routing engine/ routing logic obtaining the message to reroute. Operation 404 represents the routing logic querying the data store based on the information in the message, with operation 406 representing receiving the query response.

As set forth above, if there is no REGEX in the response as evaluated at operation 408, or no domain in the REGEX as evaluated at operation 410, the message is to be routed to a partner carrier (not a messaging hub), and is thus sent to the NPA-NXX matching routing logic for further processing, that is, to determine to which partner carrier the message is to be routed (as in the example operations of FIG. 5). If there is a domain, operation 412 is performed.

Operation 412 searches/evaluates the domain that was in the REGEX with the domain-to-messaging hub information in the data structure of respective messaging hubs and respective domains. If a match is found as evaluated by operation 414, operation 416 routes the message to the matched (partner) domain messaging hub corresponding to the matched domain. Otherwise, the message is sent to the NPA-NXX matching routing logic (as in the example operations of FIG. 5) for routing to a partner carrier.

Example operations of the NPA-NXX matching routing logic are shown in FIG. 5. Operation 502 of FIG. 5 evaluates the NPA-NXX to determine the partner carrier. Operation 504 routes the message to the partner carrier based on the NPA-NXX.

To summarize the example operations of one example implementation, if the ENUM response's REGEX contains a domain that matches a messaging hub domain, route UCE and RCS messaging traffic to the partner messaging hub domain. If the ENUM response's REGEX does not contain a domain that matches a messaging hub domain, or if the domain is absent, or if the REGEX is absent, trigger NPA-NXX matching routing logic. If at the NPA-NXX matching routing logic the NPA-NXX matches a partner carrier, route UCE and RCS messaging traffic toward the partner carrier.

Figure 6:
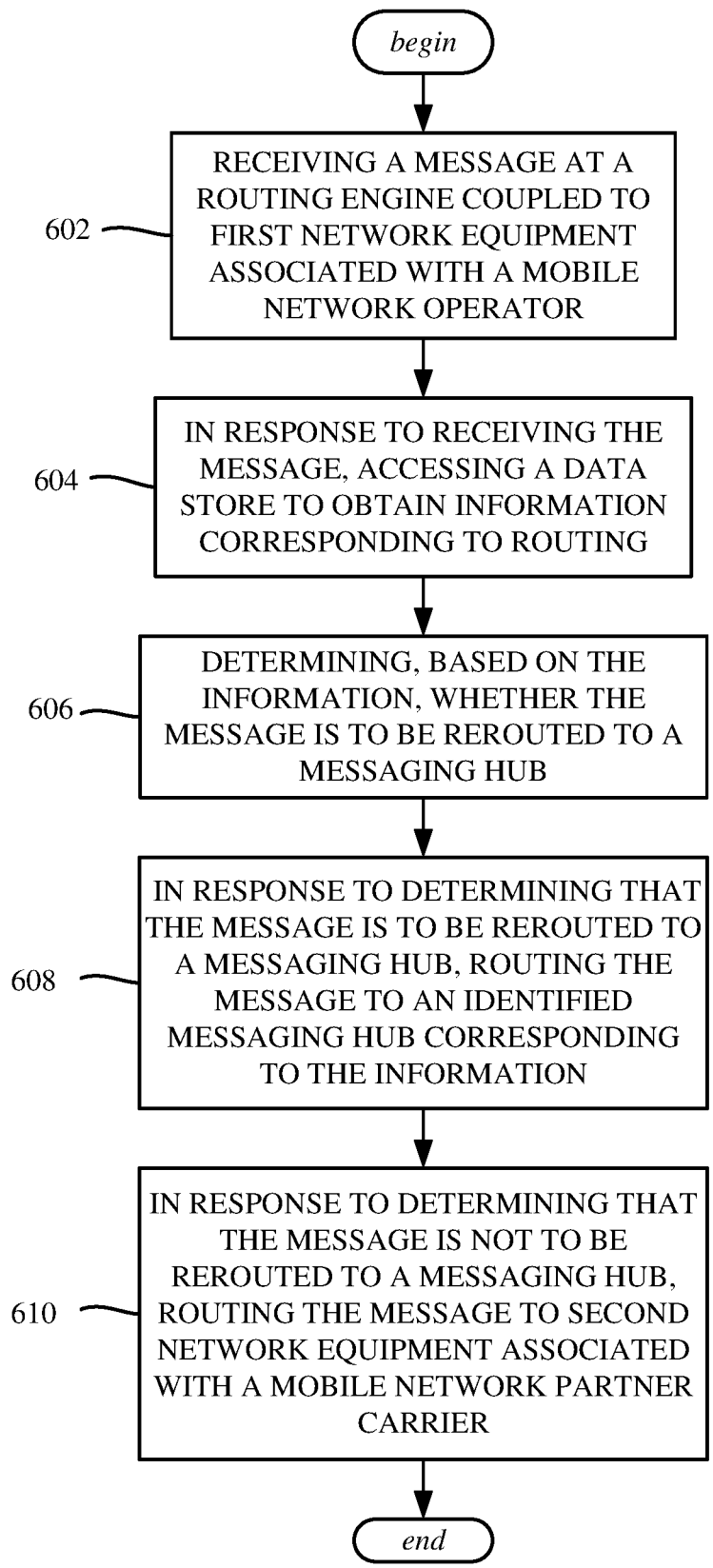
FIG. 6 is a flow diagram representing example operations related to routing a message to a messaging hub or a partner carrier, in accordance with various aspects and embodiments of the subject disclosure.

One or more example aspects are represented in FIG. 6, and can correspond to a system, including a processor, and a memory that stores executable instructions that, when executed by the processor, facilitate performance of operations. Example operation 602 represents receiving a message at a routing engine coupled to first network equipment associated with a mobile network operator. Operation 604 represents, in response to receiving the message, accessing a data store to obtain information corresponding to routing. Operation 606 represents determining, based on the information, whether the message is to be rerouted to a messaging hub. Operation 608 represents, in response to determining that the message is to be rerouted to a messaging hub, routing the message to an identified messaging hub corresponding to the information. Operation 610 represents, in response to determining that the message is not to be rerouted to a messaging hub, routing the message to second network equipment associated with a mobile network partner carrier.

The message can be a user capability exchange message. The message can be a rich communication services message.

Accessing the data store can include querying the data store, receiving the information comprising a regular expression from the data store in response to the querying; determining whether the message is to be rerouted can include processing the regular expression to locate a domain that corresponds to the identified messaging hub. Further operations can include, matching the domain with messaging hub data in a data structure to determine the identified messaging hub. The data store can include a database comprising enumerated data type data.

Accessing the data store can include querying the data store, receiving the information from the data store in response to the querying; determining that the message is not to be rerouted to a messaging hub can include determining that the information does not correspond to a domain for which the messaging hub is determinable.

Accessing the data store can include querying the data store, and receiving the information as a regular expression from the data store in response to the querying; determining whether the message is to be rerouted can include processing the regular expression to locate a domain, and wherein the determining that the message is not to be rerouted to a messaging hub comprises failing to match the domain with messaging hub data in a data structure. Routing the message to the second network equipment associated with the partner carrier can include determining the partner carrier based on a telephone number corresponding to a recipient of the message.

Routing the message to the second network equipment associated with the partner carrier can include determining the partner carrier based on an area code and prefix of a telephone number corresponding to a recipient of the message.

Accessing the data store can include querying the data store to attempt to receive a regular expression; determining that the message is not to be rerouted to a messaging hub can include determining that a regular expression has not been received in response to the querying.

Figure 7:
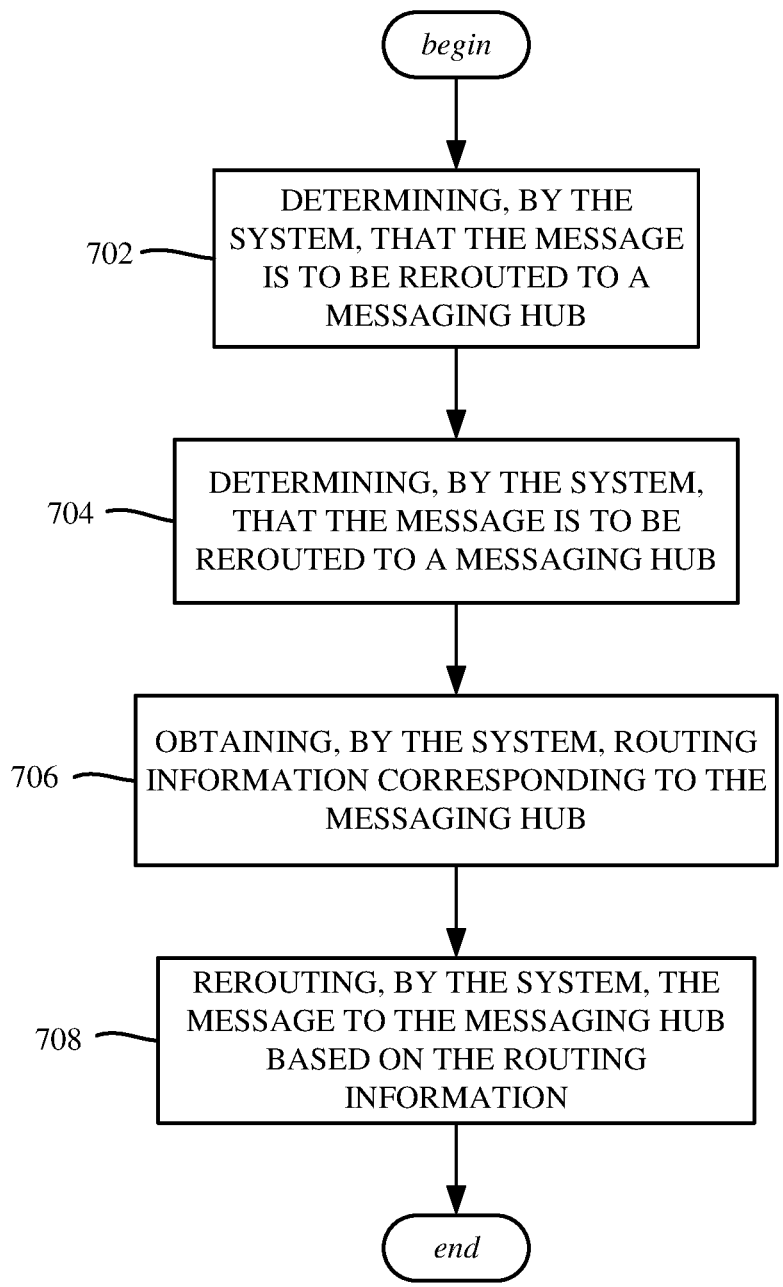
FIG. 7 is a flow diagram representing example operations related to routing a message to a messaging hub, in accordance with various aspects and embodiments of the subject disclosure.

One or more example aspects are represented in FIG. 7, and, for example, can correspond to operations, such as of a method. Example operation 702 represents receiving, at a system comprising a processor, a message. Operation 704 represents determining, by the system, that the message is to be rerouted to a messaging hub. Operation 706 represents obtaining, by the system, routing information corresponding to the messaging hub. Operation 708 represents rerouting, by the system, the message to the messaging hub based on the routing information.

Determining that the message is to be rerouted to the messaging hub can include querying a data store for registration status data associated with a recipient device identified in the message, receiving a domain in response to the querying, and matching the domain to the routing information.

Determining that the message is to be rerouted to the messaging hub can include querying a data store, receiving a regular expression in response to the querying, identifying a domain in the regular expression, and matching the domain to the routing information.

The message can be a first message; operations can include receiving, at the system, a second message, determining, by the system, that the second message is not to be rerouted to the messaging hub, and rerouting, by the system, the second message to a partner carrier network. Determining that the second message is not to be rerouted to the messaging hub can include querying a data store based on information in the message, receiving a domain in response to the querying, attempting to match the domain to data in a messaging hub routing information data structure, and failing to match the domain with the data in the messaging hub routing information data structure.

Rerouting the second message to the partner carrier can include determining the partner carrier network to which the rerouting of the second message is to occur based on area code and prefix data associated with a recipient device identified in the message.

Figure 8:
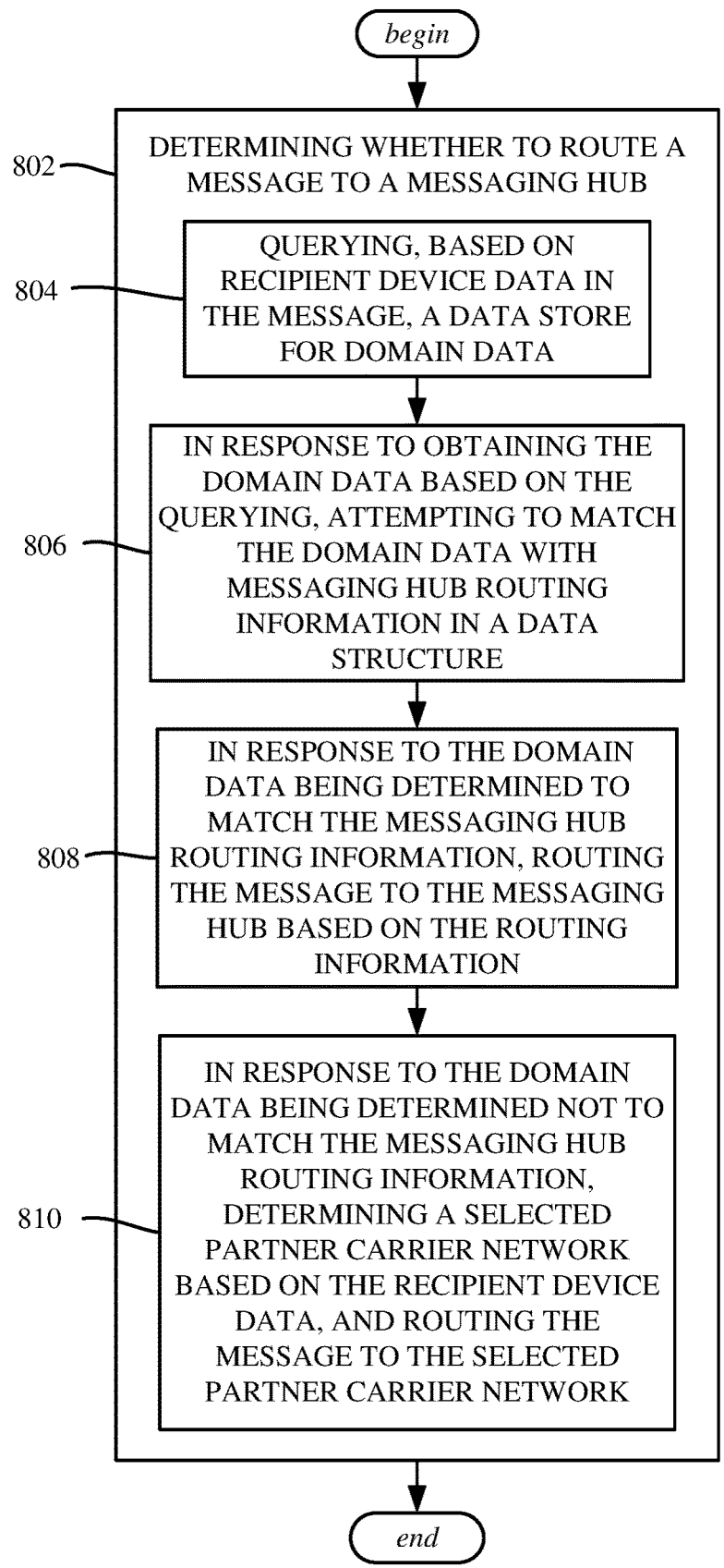
FIG. 8 is a flow diagram representing example operations related to determining whether to route a message to a messaging hub, in accordance with various aspects and embodiments of the subject disclosure.

One or more aspects are represented in FIG. 8, such as implemented in a machine-readable medium, including executable instructions that, when executed by a processor, facilitate performance of operations. Example operation 802 represents determining whether to route a message to a messaging hub. The determining can comprise querying, based on recipient device data in the message, a data store for domain data (operation 804), in response to obtaining the domain data based on the querying, attempting to match the domain data with messaging hub routing information in a data structure (operation 806), and in response to the domain data being determined to match the messaging hub routing information, routing the message to the messaging hub based on the routing information (operation 808), and in response to the domain data being determined not to match the messaging hub routing information, determining a selected partner carrier network based on the recipient device data, and routing the message to the selected partner carrier network (operation 810).

Further operations can include, in response to the domain data not being able to be obtained based on the querying, determining the selected partner carrier network based on the recipient device data, and routing the message to the selected partner carrier network.

The domain data can be obtained via a regular expression, and further operations can include parsing the regular expression to determine the domain data.

As can be seen, the technology described herein facilitates determining a subscriber who belongs to a partner carrier, including whether the RCS messaging and UCE service is being served by a messaging hub or the partner carrier itself. If the partner carrier subscriber's RCS messaging and UCE services are served by a messaging hub, the technology routes the traffic to the messaging hub; otherwise, the technology routes the traffic to a partner carrier.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 9:
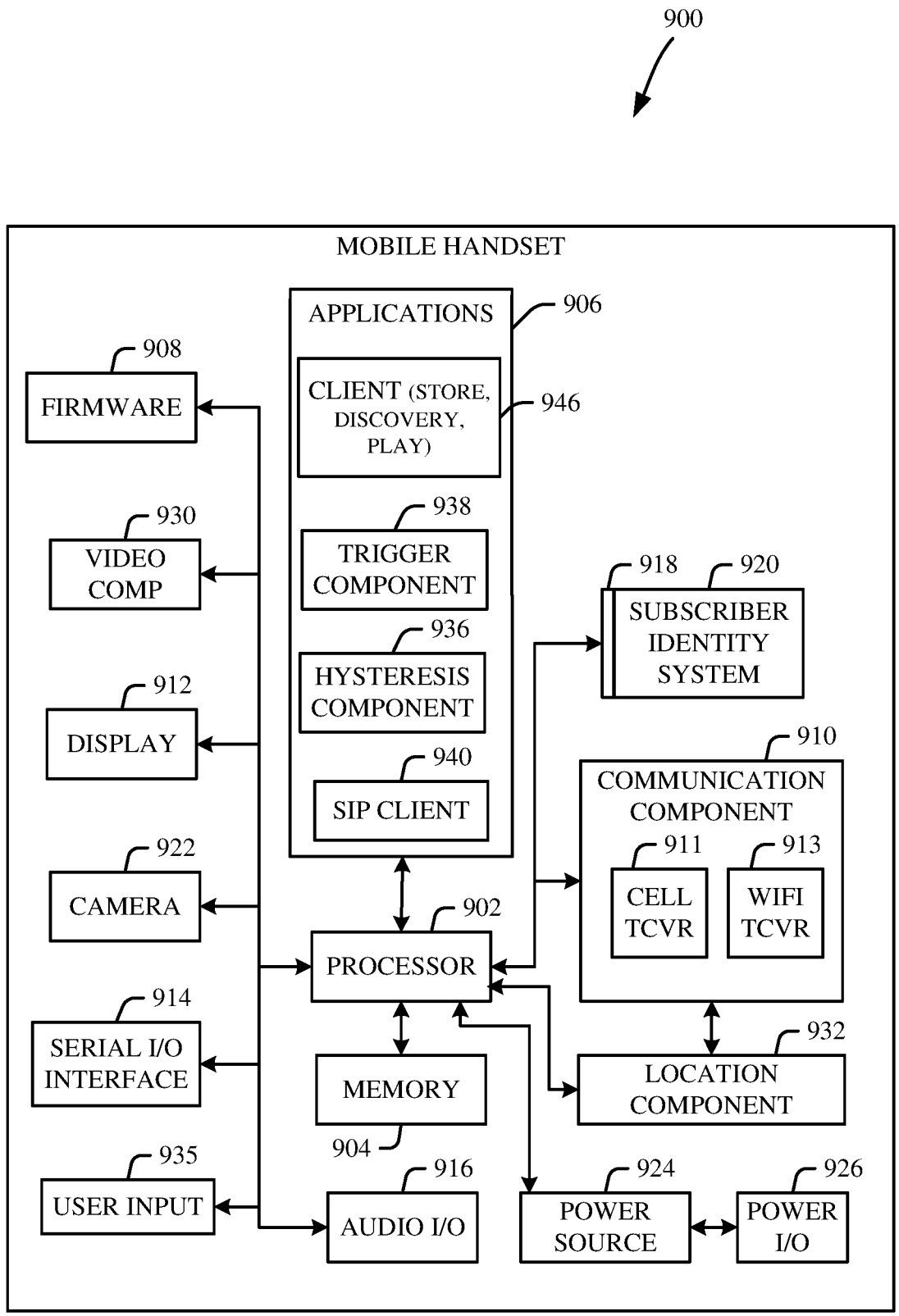
FIG. 9 illustrates an example block diagram of an example mobile handset operable to engage in a system architecture that facilitates wireless communications according to one or more embodiments described herein.

Referring now to FIG. 9, illustrated is a schematic block diagram of an example end-user device (such as user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver)

and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
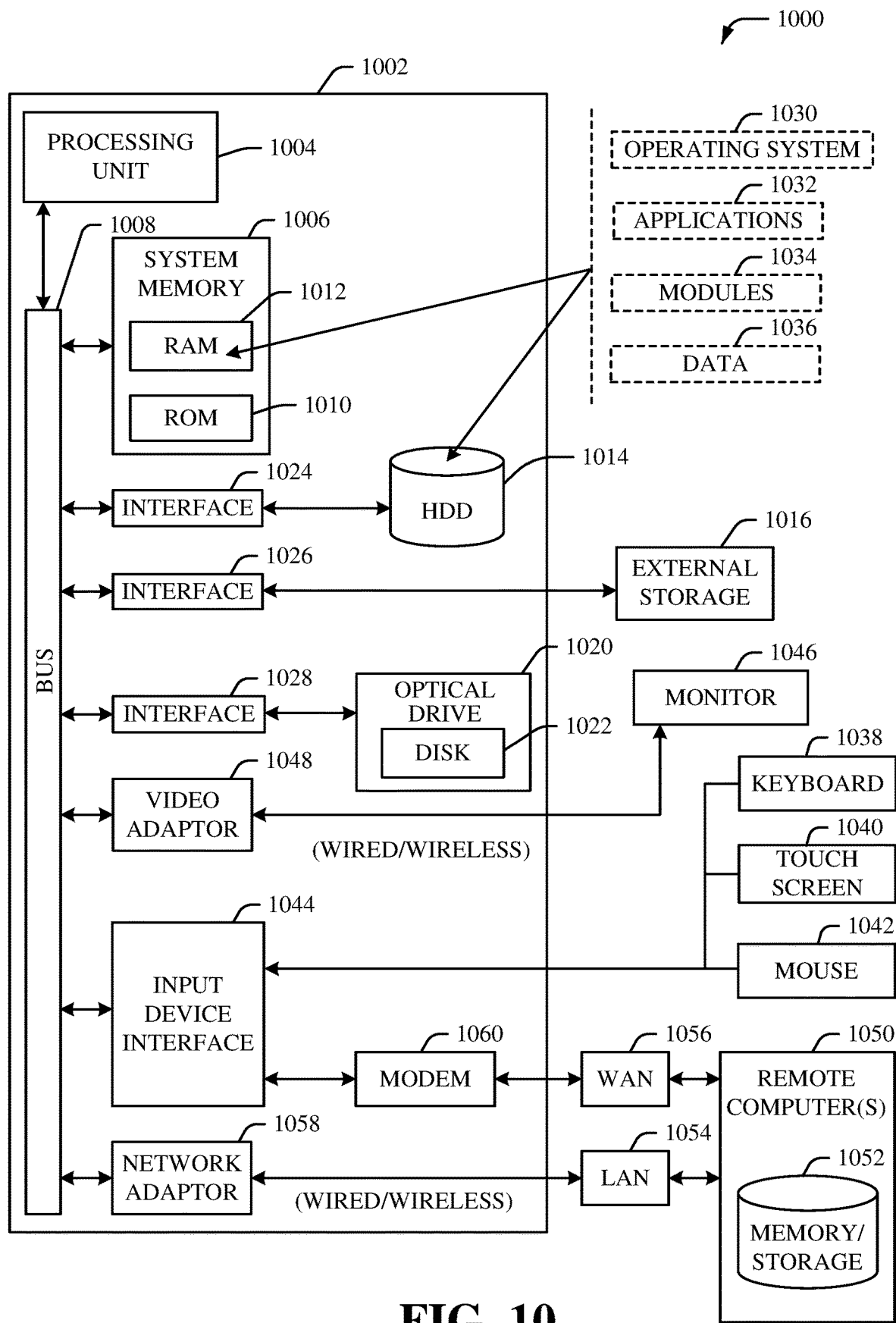
FIG. 10 illustrates an example block diagram of an example computer/machine system operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD), non-volatile memory and other storage technology could be used in addition to, or in place of, an HDD 1014, and can be internal or external. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 994 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions that, when executed by the processor of the system, facilitate performance of operations, the operations comprising:
   receiving a message at a routing engine coupled to first network equipment associated with a mobile network operator;
   in response to receiving the message, accessing a data store to obtain information corresponding to routing, wherein the accessing the data store comprises querying the data store to attempt to receive a regular expression;
   determining, based on the information, whether the message is to be rerouted to a messaging hub;
   in response to determining that the message is to be rerouted to a messaging hub, routing the message to an identified messaging hub corresponding to the information; and
   in response to determining that the message is not to be rerouted to a messaging hub, routing the message to second network equipment associated with a mobile network partner carrier, wherein the determining that the message is not to be rerouted to a messaging hub comprises determining that the regular expression has not been received in response to the querying.

2. The system of claim 1, wherein the message comprises a user capability exchange message.

3. The system of claim 1, wherein the message comprises a rich communication services message.

4. The system of claim 1, wherein the accessing the data store further comprises receiving the information comprising the regular expression from the data store in response to the querying, and wherein the determining whether the message is to be rerouted comprises processing the regular expression to locate a domain that corresponds to the identified messaging hub.

5. The system of claim 4, wherein the operations further comprise, matching the domain with messaging hub data in a data structure to determine the identified messaging hub.

6. The system of claim 4, wherein the data store comprises a database comprising enumerated data type data.

7. The system of claim 1, wherein the accessing the data store further comprises receiving the information from the data store in response to the querying, and wherein the determining that the message is not to be rerouted to a messaging hub comprises determining that the information does not correspond to a domain for which the messaging hub is determinable.

8. The system of claim 1, wherein the accessing the data store further comprises receiving the information comprising the regular expression from the data store in response to the querying, wherein the determining whether the message is to be rerouted comprises processing the regular expression to locate a domain, and wherein the determining that the message is not to be rerouted to a messaging hub comprises failing to match the domain with messaging hub data in a data structure.

9. The system of claim 8, wherein the routing the message to the second network equipment associated with the mobile network partner carrier comprises determining the mobile network partner carrier based on a telephone number corresponding to a recipient of the message.

10. The system of claim 8, wherein the routing the message to the second network equipment associated with the mobile network partner carrier comprises determining the mobile network partner carrier based on an area code and a prefix of a telephone number corresponding to a recipient of the message.

11. A method, comprising:
    receiving, at a system comprising a processor, a first message;
    determining, by the system, that the first message is to be rerouted to a messaging hub;
    obtaining, by the system, routing information corresponding to the messaging hub;
    rerouting, by the system, the first message to the messaging hub based on the routing information;
    receiving, at the system, a second message;
    determining, by the system, that the second message is not to be rerouted to the messaging hub; and
    rerouting, by the system, the second message to a partner carrier network.

12. The method of claim 11, wherein the determining that the first message is to be rerouted to the messaging hub comprises querying a data store for registration status data associated with a recipient device identified in the first message, receiving a domain in response to the querying, and matching the domain to the routing information.

13. The method of claim 11, wherein the determining that the first message is to be rerouted to the messaging hub comprises querying a data store, receiving a regular expression in response to the querying, identifying a domain in the regular expression, and matching the domain to the routing information.

14. The method of claim 11, wherein the determining that the second message is not to be rerouted to the messaging hub comprises querying a data store based on information in the second message, receiving a domain in response to the querying, attempting to match the domain to data in a messaging hub routing information data structure, and failing to match the domain with the data in the messaging hub routing information data structure.

15. The method of claim 11, wherein the rerouting the second message to the partner carrier network comprises determining the partner carrier network to which the rerouting of the second message is to occur based on area code and prefix data associated with a recipient device identified in the second message.

16. A non-transitory machine-readable medium, comprising executable instructions that, when executed by a processor, facilitate performance of operations, the operations comprising:

receiving a message at a routing engine coupled to first network equipment associated with a mobile network operator;

in response to receiving the message, accessing a data store to obtain information corresponding to routing, wherein the accessing the data store comprises querying the data store to attempt to receive a regular expression;

determining, based on the information, whether the message is to be rerouted to a messaging hub;

in response to determining that the message is to be rerouted to a messaging hub, routing the message to an identified messaging hub corresponding to the information; and in response to determining that the message is not to be rerouted to a messaging hub, routing the message to second network equipment associated with a mobile network partner carrier, wherein the determining that the message is not to be rerouted to a messaging hub comprises determining that the regular expression has not been received in response to the querying.

17. The non-transitory machine-readable medium of claim 16, wherein accessing the data store further comprises receiving the information comprising the regular expression from the data store in response to the querying, and wherein the determining whether the message is to be rerouted comprises processing the regular expression to locate a domain that corresponds to the identified messaging hub.

18. The non-transitory machine-readable medium of claim 17, wherein the operations further comprise, matching the domain with messaging hub data in a data structure to determine the identified messaging hub.

19. The non-transitory machine-readable medium of claim 16, wherein the message comprises a user capability exchange message.

20. The non-transitory machine-readable medium of claim 16, wherein the message comprises a rich communication services message.

* * * * *